United States Patent
Xu et al.

(10) Patent No.: US 12,197,539 B2
(45) Date of Patent: Jan. 14, 2025

(54) SECURE STORAGE AND PROCESSING OF DATA FOR GENERATING TRAINING DATA

(71) Applicant: Microsoft Technology Licensing, LLC, Redmond, WA (US)

(72) Inventors: Yunpeng Xu, Millburn, NJ (US); Tianhao Lu, New York City, NY (US); Xiaoqiang Luo, Cos Cob, CT (US); Jiashuo Wang, Mountain View, CA (US); Chencheng Wu, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 927 days.

(21) Appl. No.: 17/169,161

(22) Filed: Feb. 5, 2021

(65) Prior Publication Data

US 2022/0253540 A1    Aug. 11, 2022

(51) Int. Cl.
    *G06F 18/21*     (2023.01)
    *G06F 18/214*     (2023.01)
    *G06N 20/00*     (2019.01)

(52) U.S. Cl.
    CPC ...... *G06F 18/2178* (2023.01); *G06F 18/2148* (2023.01); *G06N 20/00* (2019.01)

(58) Field of Classification Search
    CPC .. G06F 18/2178; G06F 18/2148; G06N 20/00
    See application file for complete search history.

(56) References Cited

U.S. PATENT DOCUMENTS

| | | | |
|---|---|---|---|
| 8,285,719 B1 * | 10/2012 | Long | G06F 16/285 |
| | | | 707/739 |
| 9,697,475 B1 * | 7/2017 | Subramanya | G06N 7/01 |
| 10,305,845 B1 * | 5/2019 | Waagen | H04L 67/306 |
| 10,558,923 B1 * | 2/2020 | Kenthapadi | G06N 7/01 |
| 10,650,326 B1 * | 5/2020 | Johnston | G06F 16/23 |

(Continued)

FOREIGN PATENT DOCUMENTS

| | | | | |
|---|---|---|---|---|
| CN | 102982097 A | * | 3/2013 | G06N 5/022 |
| WO | WO-2009086311 A1 | * | 7/2009 | G06F 17/30303 |

OTHER PUBLICATIONS

"International Search Report and Written Opinion Issued in PCT Application No. PCT/US22/012695", Mailed Date: Mar. 31, 2022, 10 Pages.

(Continued)

*Primary Examiner* — Shahid K Khan
(74) *Attorney, Agent, or Firm* — NICHOLSON DE VOS WEBSTER & ELLIOTT LLP

(57) ABSTRACT

Techniques for securely storing and processing data for training data generation are provided. In one technique, multiple encrypted records are retrieved from a first persistent storage. For each encrypted record, that record is decrypted in memory to generate a decrypted record that comprises multiple attribute values. Then, based on the attribute values and a definition of multiple features of a machine-learned model, multiple feature values are generated and stored, along with a label, in a training instance, which is then stored in a second persistent storage. One or more machine learning techniques are used to train the machine-learned model based on training data that includes the training instances that are stored in the second persistent storage.

20 Claims, 5 Drawing Sheets

(56) References Cited

U.S. PATENT DOCUMENTS

| | | | |
|---|---|---|---|
| 10,692,127 B1 | 6/2020 | Kumar et al. | |
| 10,873,533 B1* | 12/2020 | Ismailsheriff | H04L 47/27 |
| 11,106,692 B1* | 8/2021 | Guetta | G06F 16/248 |
| 2011/0225155 A1* | 9/2011 | Roulland | G06F 16/3325 |
| | | | 707/750 |
| 2011/0307435 A1* | 12/2011 | Overell | G06F 16/367 |
| | | | 706/46 |
| 2013/0117203 A1* | 5/2013 | Malka | G06N 5/022 |
| | | | 706/12 |
| 2014/0279583 A1* | 9/2014 | Surdeanu | G06Q 50/184 |
| | | | 705/310 |
| 2015/0242407 A1* | 8/2015 | Frohock | G06F 16/21 |
| | | | 707/749 |
| 2015/0379072 A1 | 12/2015 | Dirac et al. | |
| 2016/0350675 A1* | 12/2016 | Laks | G06N 20/00 |
| 2017/0097984 A1* | 4/2017 | Haldar | G06F 16/288 |
| 2017/0098013 A1* | 4/2017 | Shirwadkar | G06F 16/36 |
| 2017/0099249 A1* | 4/2017 | Kozareva | G06N 5/022 |
| 2017/0242886 A1* | 8/2017 | Jolley | G06F 40/211 |
| 2017/0255867 A1* | 9/2017 | Ramachandran | G06F 16/2358 |
| 2017/0308802 A1* | 10/2017 | Ramsøy | G06N 20/00 |
| 2017/0337265 A1* | 11/2017 | Garrett | G06F 16/338 |
| 2018/0232644 A1* | 8/2018 | Acharya | G06N 5/043 |
| 2018/0330179 A1* | 11/2018 | Streit | G06F 18/2414 |
| 2019/0012609 A1* | 1/2019 | Fishler | G06N 20/00 |
| 2019/0102078 A1* | 4/2019 | Bhatt | G06F 3/0481 |
| 2019/0102675 A1* | 4/2019 | Biswas | G06N 3/045 |
| 2020/0042828 A1* | 2/2020 | Silberman | G06F 21/6218 |
| 2020/0402625 A1 | 12/2020 | Aravamudan et al. | |
| 2021/0110295 A1* | 4/2021 | Oberhofer | G06N 5/04 |
| 2021/0256032 A1* | 8/2021 | Burbank | G06F 16/906 |
| 2021/0397726 A1 | 12/2021 | Kulaga et al. | |
| 2022/0318429 A1* | 10/2022 | Levy | H04L 67/06 |
| 2022/0318665 A1* | 10/2022 | Levy | G06F 21/566 |
| 2022/0321541 A1 | 10/2022 | Zhao et al. | |

OTHER PUBLICATIONS

"Notice of Allowance Issued in U.S. Appl. No. 17/219,482", Mailed Date: Jul. 21, 2023, 11 Pages.

Thilakanathan, et al., "SafeProtect: Controlled Data Sharing With User-Defined Policies in Cloud-Based Collaborative Environment", In Proceedings of IEEE Transactions on Emerging Topics in Computing, vol. 4, Issue 2, Apr. 2019, pp. 301-315.

Vimercati, et al., "Encryption-Based Policy Enforcement for Cloud Storage", In Proceedings of IEEE 30th International Conference on Distributed Computing Systems Workshops, Jun. 21, 2010, pp. 42-51.

U.S. Appl. No. 17/219,482, filed Mar. 31, 2021.

* cited by examiner

SECURE STORAGE AND PROCESSING OF DATA FOR GENERATING TRAINING DATA

TECHNICAL FIELD

The present disclosure relates to machine learning and, more particularly to, secure storage and processing of data for generating training data that is used to train one or more models.

BACKGROUND

Machine learning is the study and construction of algorithms that can learn from, and make predictions on, data. Such algorithms operate by building a model from inputs in order to make data-driven predictions or decisions. Thus, a machine learning technique is used to generate a statistical model that is trained based on a history of attribute values associated with a certain number of entities. The statistical model is trained based on multiple attributes (or factors). In machine learning parlance, such attributes are referred to as "features." To generate and train a statistical model, a set of features is specified and a set of training data is identified.

Generally, the more training data that is used to train a model, the more useful the model is along one or more dimensions of utility, such as precision, recall, and accuracy. However, in many contexts, the amount of training data is limited due to human considerations and cost. For example, some training data requires people to manually label each instance in the training data, which can be a time-intensive and error-prone process. As another example, some sources of training data are encrypted, making them unavailable for generating training data. Accidently exposing such data in a decrypted form is unacceptable and, therefore, encrypted data is not leveraged in training models. Also, encrypted data may be more representative of the type of data for which predictions are made. Thus, many machine-learned models suffer in terms of accuracy due to the insufficiency in the amount, and variation, of training data.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A system and method are provided for securely storing and processing data for generating training instances. In one technique, encrypted records are stored and analyzed to determine a target entity identifier for each encrypted record. For each encrypted record, contents of the record are decrypted and processed in memory. While in memory, a set of feature values are generated based on the decrypted data and a definition of the corresponding features of a machine-learned model. Though generated based on the decrypted data, none of the set of feature values actually include any of the decrypted data. The set of feature values is stored in a training instance/sample and added to a set of training data that is stored in persistent storage. In this way, even if the set of training data is accessed by an unauthorized individual, none of the data from the corresponding encrypted record can be determined. The set of training data is eventually used to further train the model.

Thus, embodiments maintain the security of the data in the machine learning system and the accuracy of a resulting machine-learned model. While unauthorized access to training data might not be preventable, such access will not reveal any decrypted data about the corresponding entities, whether individuals or organizations. In this way, third-party client systems can trust that a decrypted version of their data will not be exposed to unauthorized users. Additionally, the machine learning system has access to much more data than was previously available. The machine learning system processes that data in a secure manner to generate training data, which is then used to train a machine-learned model. Due to the amount of additional training data and the nature of the training data, the accuracy of a machine-learned model is greatly improved.

System Overview

Figure 1:
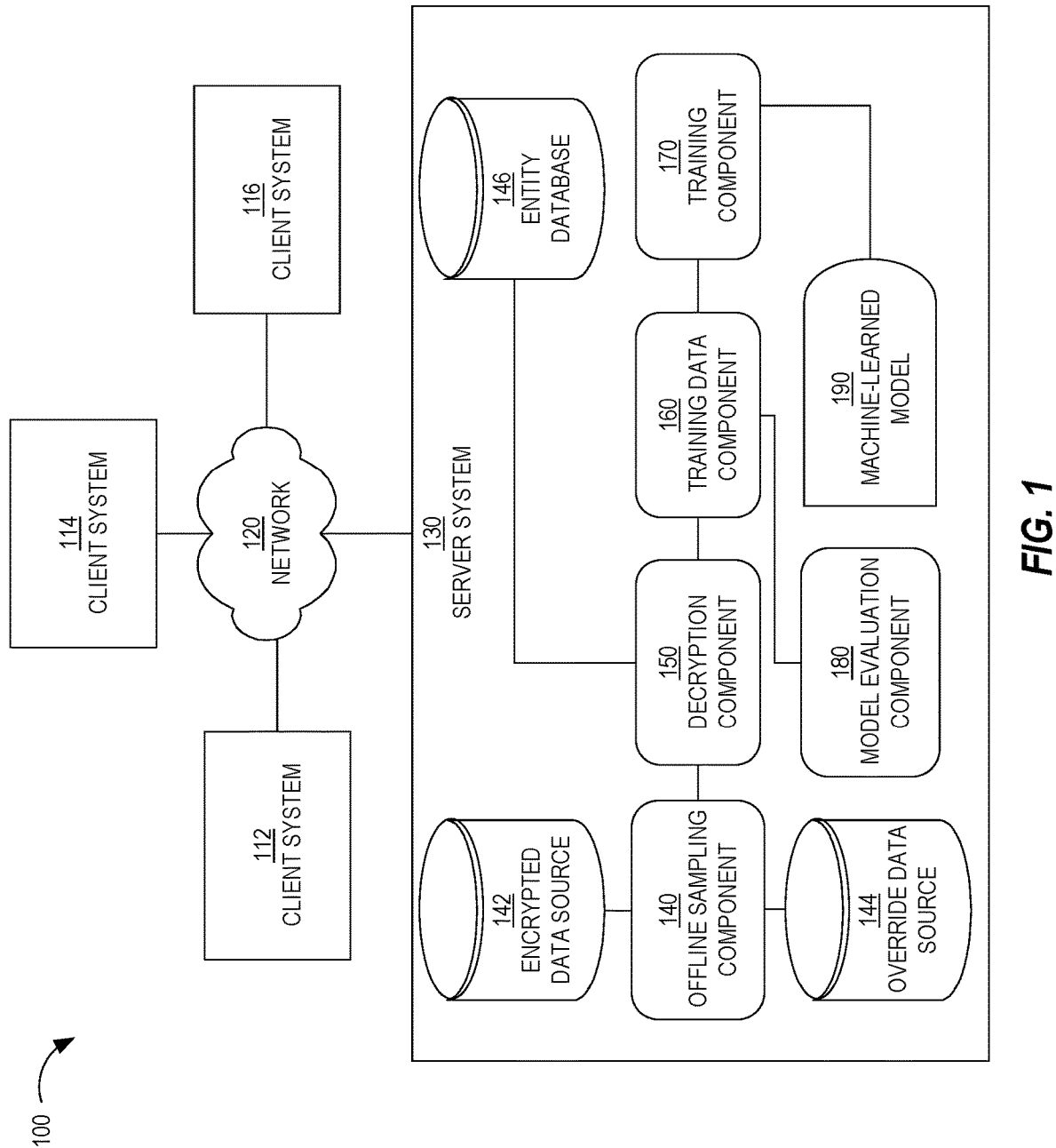
FIG. 1 is a block diagram that depicts an example system for generating training data in a secure manner, in an embodiment.

FIG. 1 is a block diagram that depicts an example system 100 for generating training data in a secure manner, in an embodiment. System 100 includes client systems 112-116, a network 120, and a server system 130. Server system 130 comprises an offline sampling component 140, a decryption component 150, a training data component 160, a training component 170, and a model evaluation component 180. Each of components 140-180 is implemented in software, hardware, or a combination of software and hardware. The functionality of components 140-180 may be implemented in a single program or in across multiple programs in order to adhere to component-based software engineering.

Components 140-180 may be implemented on the same computing device or on multiple computing devices. For example, each of components 140-180 may be implemented on different computing devices that are communicatively coupled to each other over a computer network, such as a local area network (LAN), wide area network (WAN), or the Internet. Similarly, client systems 112-116 are communicatively coupled to server system 130 over network 120. Although only three client systems 112-116 are depicted, system 100 may include many client systems that are communicatively coupled to server system 130 over network 120.

Entity Resolution

One example context in which embodiments may arise is entity resolution. Thus, in an embodiment, server system 130 performs entity resolution, which involves identifying an entity from among a set of known entities given a set of one or more attribute values pertaining to an "unknown" entity. Server system 130 stores information about the set of known entities in entity database 146. Each record in entity database 146 includes (1) an entity identifier that is unique relative to other entity identifiers stored in entity database 146 and (2) one or more attribute values, such as entity name, geographic location(s) of the entity, industry, number of employees of the entity (if the entity is an employer), public revenue information (e.g., yearly, quarterly) of the entity, public expense information (e.g., yearly, quarterly) of the entity, names of principals of the entity, contact information for those principals, products/services that the entity provides, and current employees of the entity.

Data about an initially "unknown" entity is received from a third party (e.g., client system 112) relative to server system 130. The data may be in the form of a record, such as a customer relationship management (CRM) record. Entity resolution may involve: (1) identifying multiple candidate entities, from entity database 146, through one or more (e.g., hand-curated) rules given one or more attribute values (from the third party) of an unknown entity (i.e., initially "unknown" to server system 130); (2) invoking, for each identified candidate entity, a machine-learned model using (a) input that comprises a set of feature values (that are based on the one or more attribute values) and (b) entity data, from entity database 146, about the candidate entity; and (3) selecting the candidate entity with the highest score produced by the machine-learned model. One or more candidate entities may be presented to a user that is affiliated with the third party that provided the data about the unknown entity.

In an embodiment, the entity resolution service provided by server system 130 maintains a record of entity matches. If a user believes that one of the presented candidate entities matches the unknown entity, then the user may provide input that selects a name or other identifier of that candidate entity. Server system 130 records the selection indicating that the initially unknown entity matches the candidate entity. The record may include an entity identifier of the candidate entity and the set of one or more attribute values of the initially unknown entity. Server system 130 may also record that the initially unknown entity does not match any of the other candidate entities whose names were presented to the user. Thus, the record may include the entity identifier of each of the other candidate entities and the set of one or more attribute values of the initially unknown entity.

In some embodiments, a user only provides feedback regarding a proposed match if the user determines that the proposed match produced by the entity resolution service is incorrect. In response to user input that indicates an incorrect association between a candidate entity and an unknown entity, server system 130 may present a list of one or more alternative candidate entities, from which the user selects one. This is referred to as a "user override," or simply an "override." A record of an override includes an entity identifier of the selected candidate entity and a record identifier that uniquely identifies the record. The record may be stored in feedback data source 144.

A reason for performing entity resolution is to allow third parties to discover additional information about entities, which additional information is maintained or hosted at server system 130. For example, a third party may only have an organization name and desires to discover the identity of principals of the organization that has the same organization name. However, multiple organizations may share the same (or very similar) name (e.g., ABC Corp. v. ABC Inc.), but are (a) part of different industries and/or (b) based in different geographic locations. Therefore, it may be difficult to resolve an entity based on organization name alone.

Entity resolution may be part of an online product or service provided by server system 130. An example of such an online service is an entity navigation service that allows users of client devices (i.e., remote relative to server system 130) to search entities from an entity database, maintained by server system 130, browse information about each searched entity, and also make "connections" with affiliated entities of a searched entity. For example, a searched entity may be a particular company, while affiliated entities of the particular company may be principals and/or employees of the particular company.

Upon discovering an affiliated entity, a user of a client device may provide user input that causes a connection request to be transmitted to an account of the affiliated entity. If the affiliated entity accepts the connection request, then server system 130 updates connection data that indicates that the user and the affiliated entity are connections in a connection network. As a result of a connection between two connected entities, server system 130 allows information (e.g., messages, posts, viral actions) of one connected entity to be shared with (or viewable by) the other connected entity. The connection and sharing capabilities may be made through an entity connection service (also provided by server system 130) that is separate from the entity navigation service but that is integrated with the entity navigation service.

The utility of the entity navigation service and the entity connection service depends, at least in part, on the accuracy and quality of the entity resolution service. If the entity resolution service performs poorly by failing to identify high quality candidate entities given a set of one or more attribute values of an unknown entity, then users are less likely to use the entity navigation service and, as a result, are less likely to create connections with affiliated entities through the entity connection service. Thus, embodiments herein involve technical steps to generate additional training instances to improve the accuracy of the entity resolution service.

Process Overview

Figure 2:
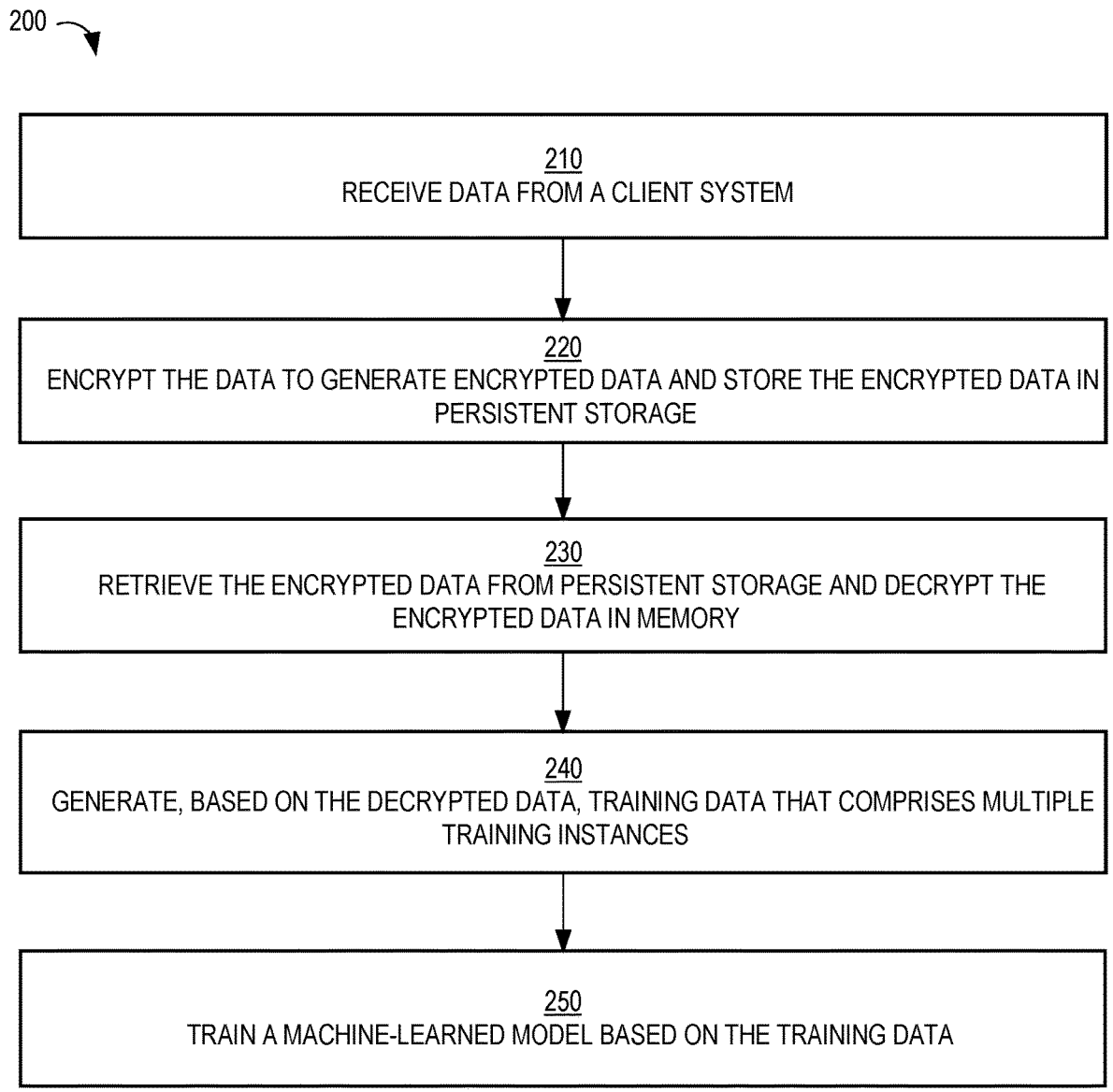
FIG. 2 is a high-level flow diagram that depicts an example process 200 for training a machine-learned model based on decrypted data, in an embodiment.

FIG. 2 is a high-level flow diagram that depicts an example process 200 for training a machine-learned model based on decrypted data, in an embodiment. Process 200 may be performed by different components of server system 130.

At block 210, server system 130 receives data from a client system, such as client system 112. The data may be initially in an unencrypted state. If received in an unencrypted state, then the data is not yet stored in persistent storage.

At block 220, server system 130 encrypts the data to generate encrypted data and stores the encrypted data in persistent storage.

At block 230, server system 130 retrieves the encrypted data from persistent storage and decrypts the data in memory, or volatile storage. Block 230 may be performed when a data pipeline is built that processes the decrypted data in an orderly manner to achieve a desired goal, such as retraining a machine-learned model.

At block 240, server system 130 generates, based on the decrypted data, training data that comprises multiple training instances. Block 240 may involve generating a label for each training instance in the training data based on whether the feature values associated with the training instance represent a positive instance or a negative instance. Details regarding how block 240 may be performed are provided in more detail herein. For example, the training data may be used to train an entity resolution model that generates a score for a candidate entity based on one or more attribute values of the candidate entity and one or more attribute values of a source (or unknown) entity, which is an entity reflected in a decrypted record.

At block 250, server system 130 trains a machine-learned model based on the training data. Block 250 may comprise (a) a re-training of the machine-learned model if the machine-learned model has already been trained based on other training data or (b) an initial training of the machine-learned model if the weights or coefficients of the machine-learned model are initialized randomly.

The following description provides more details about process 200 and the components that perform them.

Offline Sampling Component

In order to automatically generate training data based on third party sources that contain secure information, client systems 112-116 send (or otherwise make available) their respective data to server system 130, which stores the data (in an encrypted state) in encrypted data source 142. Sometime later, offline sampling component 140 retrieves the encrypted data records from encrypted data source 142. Encrypted data source 142 is persistent, or non-volatile, storage that is either local to offline sampling component 140 or server system 130 or remote relative to server system 130. Examples of encrypted data source 142 include a database (e.g., a relational database or a key-value store) and a file system. Data stored in encrypted data source 142 may originate from one of client systems 112-116 and might not be encrypted when that data is stored in data storage that is local to that client system. Thus, the data may be encrypted prior to, or just after being transmitted to, server system 130 for subsequent storage in encrypted data source 142. Thus, in the latter scenario, the encryption may be performed in volatile memory of server system 130.

Data in encrypted data source 142 is encrypted with an encryption key to ensure that any unauthorized access to the data does not reveal the identities of the entities indicated in the data. Thus, the data may be encrypted to preserve user privacy and/or to satisfy legal obligations. The data that is encrypted may be any type of data, such as account data that is stored in a customer relationship management (CRM) database. Thus, each record in the CRM database may correspond to an account or an entity, such as an individual or an organization. Examples of organizations include companies, academic institutions, government agencies, and charities. The type of entity dictates the type of information that is encrypted. For example, if the entity is an individual, then possible attributes of the entity include first name, last name, employer name, employment status, geographic residence, mailing address, email address, phone number, job title, job function, industry, academic institution attended, degrees earned, endorsements received, and skills. If the entity is an organization, then possible attributes of the entity include name of organization, geographic location of office(s), industry, number of employees, revenue information (e.g., yearly, quarterly), expense information (e.g., yearly, quarterly), names of principals of the organization, contact information for those principals, products/services in which the organization might be interested, and current contacts at the organization.

The data in encrypted data source 142 may be more representative (relative to traditional training data) of the type of data upon which predictions are made. In other words, many times a prediction, such as for entity resolution, is based on limited data, such as an entity name and the name of a country in which the entity resides. Similarly, the data in encrypted data source 142 may also be limited. In contrast, the data upon which the machine-learned model is traditionally trained (the "training data") is not representative of the data upon which predictions are made. For example, each training instance in the training data may contain data that is based on six or more attribute values of the corresponding entity. Not only may data in encrypted data source 142 be more representative than the traditional training data in terms of amount of information known about each entity, the former may be more representative than the traditional training data in terms of the combination of specific attributes. For example, an entity name and a geography may be a common pair of attributes found in encrypted data source 142, whereas traditional training data might not have many instances reflecting that pair of attributes.

In systems that require remote data to remain encrypted and the remote data makes up the larger source of potential training data, a relatively small amount of data may be decrypted, such as data that originates from local sources (e.g., from entity database 146) since the entity or party that implements embodiments herein fully owns that data.

In an embodiment, each record in encrypted data source 142 corresponds to an entity and includes a record identifier that uniquely identifies the record relative to other records in encrypted data source 142. Such a record identifier may have been assigned by the client system from which the corresponding record originates. In a related embodiment, each record includes an entity identifier that uniquely identifies an entity relative to other entities reflected in entity database 146. Server system 130 is operated by a party that is different than the entities whose information is stored and managed by server system 130. An example of such a party is LinkedIn, which provides an online connection service that allows individuals and organizations to create their own profiles, create connections with each other, and share information with each other using various online products and services. Examples of such online services include the entity navigation service and the entity resolution service described herein. In an embodiment pertaining to entity resolution, offline sampling component 140 also retrieves feedback data from feedback data source 144. Examples of feedback data source 144 also include a database and a file system. Feedback data is data that is generated in response to user input that indicates that one or more suggested (candidate) entities do not match a particular entity that corresponds to a particular record in encrypted data source 142.

Figure 3:
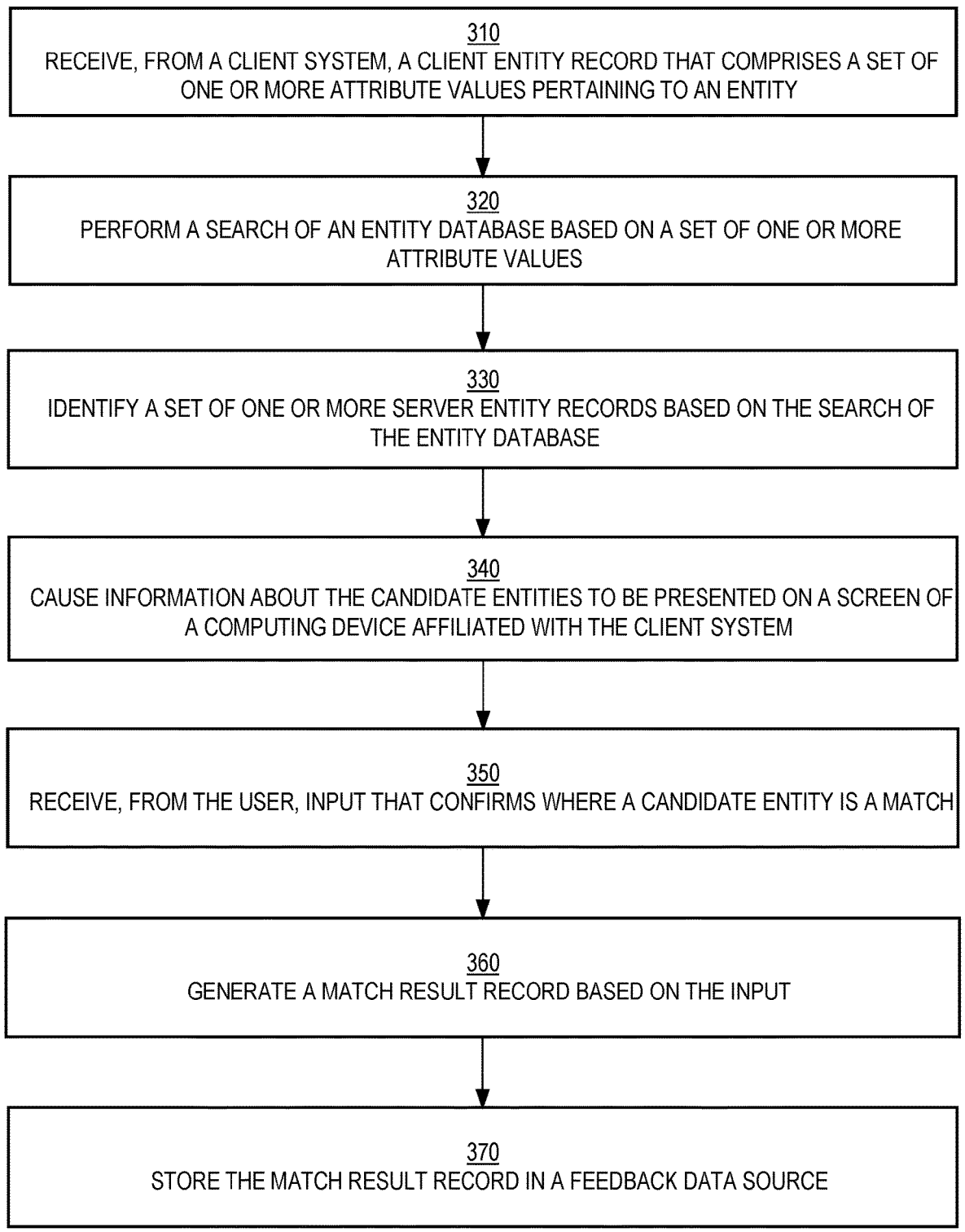
FIG. 3 is a flow diagram that depicts an example process for performing entity matching, in an embodiment.

FIG. 3 is a flow diagram that depicts an example process 300 for performing entity matching, in an embodiment.

Process 300 is performed by server system 130 and may be implemented in the context of entity resolution.

At block 310, server system 130 receives, from a client system, a client entity record that comprises a set of one or more attribute values pertaining to an entity. Block 310 may be performed in response to a user affiliated with client system 112 providing input that instructs client system 112 to transmit one or more client entity records to server system 130.

At block 320, server system 130 performs a search of entity database 146 based on the set of one or more attribute values. Block 320 may involve identifying all server entity records in entity database 146 that include the one or more attribute values, or portions thereof. If server system 130 determines that an attribute value pertains to a particular attribute (e.g., entity name), then the search may be limited to the corresponding field in each server entity record in entity database 146. Alternatively, server system 130 leverages an index that has been generated based on one or more of the field names of the server entity records in order to avoid a scan of all server entity records in entity database 146.

At block 330, server system 130 identifies a set of one or more server entity records based on the search of entity database 146. This set of server entity records may be less than all the server entity records that at least partially matched. For example, block 330 may involve identifying server entity records that are associated with a match score above a certain match threshold. (A match score may be generated using one or more heuristic rules that compare the set of one or more attribute values with attribute values stored in server entity records. Alternatively, a match score may be generated by a machine-learned model whose features are based on the set of attribute values.) The one or more entities reflected in the set of one or more server entity records are referred to as candidate entities.

At block 340, server system 130 causes information about the candidate entities to be presented on a screen of a computing device (not depicted) affiliated with client system 112. The information about a candidate entity may include a name, a logo, an industry, and a geographic location associated with the candidate entity. The candidate entity is presented on the computing device as possibly matching a particular entity indicated in the client entity record received from client system 112. The candidate entity may have been presented in response to machine-learned model 190 generating one or more scores, one for each possible matching entity that might match the particular entity. For each score, the information (i.e., the one or more attribute values) from the client entity record is input into machine-learned model 190 along with information about a possible matching entity. In an embodiment, the higher the score for a possible matching entity, the more likely that the possible matching entity matches the particular entity and, as a result, is selected as a candidate entity.

At block 350, the user provides input that confirms whether a candidate entity is a match. The user employs a computing device to transmit the input. For example, a user interface displays a set of candidate entities and includes user interface elements that allow the user to select one of the candidate entities.

At block 360, server system 130 generates a match result record based on the input. For example, if the user of the computing device provides input that confirms that the candidate entity matches the particular entity, then a positive match result record is generated. Also, entity information, from entity database 146, about the particular entity may be made available to client system 112, such that the client entity record stored in client system 112 is automatically modified to include the portion of entity information that is not already stored in the client entity record. For example, if the client entity record does not include geographic location information of the particular entity and the corresponding server entity record from entity database 146 includes geographic location information, then such geographic location information is transmitted to client system 112, which updates the client entity record with the geographic location information.

If the user of the computing device provides input that indicates that a candidate entity does not match the particular entity, then a negative match result record generated. A match result record includes an entity identifier of the candidate entity and a record identifier of the client entity record stored in client system 112. A positive match result record indicates that the candidate entity matches the particular entity, while a negative match result record indicates that the candidate entity does not match the particular entity.

At block 370, server system 130 stores the match result record (whether positive or negative) in feedback data source 144. The match result records may be later used to generate training instances based on previously-encrypted data.

In an embodiment where users of one or more client systems 112-116 do not provide (or are not able to provide) positive feedback affirming that candidate entities match corresponding entities indicated in client entity records in the client system(s), then all records in the feedback data in feedback data source 144 contain a negative match result and no records contain only positive match results.

In an embodiment, a match result record includes at least two entity identifiers, one of a candidate entity that did not match and one of another candidate entity that does match. Server system 130 may have automatically identified (and presented information about) the matching entity as one of multiple options or suggestions and the user operating the computing device selected that matching entity (e.g., by selecting a graphical element that encompasses or is adjacent to information about the matching entity). Alternatively, the user may have manually specified one or more search criteria for a search and, after server system 130 performs an electronic search based on search criteria and causes a set of search results (each corresponding to a different entity) to be presented on the computing device, the user selected one of the search results corresponding to an entity. To the extent that a user was presented with three or more options, suggestions, or search results (each corresponding to a different entity), and the user selects one of them, then there are multiple negative matches, or multiple entities that did not match. Thus, a match result record may include multiple entity identifiers, each corresponding to an entity that did not match.

In an embodiment, feedback data source 144 does not include any information from a client system (such as client system 112), except for a record identifier of a matching entity or of a non-matching entity. For each match result record, offline sampling component 140 uses a record identifier in the match result record to identify a corresponding record in encrypted data source 142.

Identifying Target Entities Using URLs

In some scenarios, the amount of feedback data in feedback data source 144 may be relatively small. For example, the number of entities reflected in feedback data source 144 may be less than 10% than the number of entities reflected in encrypted data source 142. (Depending on implementation and assuming there are no duplicates, the number of entities reflected in either data source may be equivalent to the number of records in that data source.) Therefore, additional ways to generate positive training instances may be needed in order to generate sufficient training data for model 190. One such way is through URLs that are included in records in encrypted data source 142.

In an embodiment, one or more records in encrypted data source 142 includes a uniform resource locator (URL). A URL acts as an identifier that uniquely identifies a target entity, which is the entity associated with (and indicated in) a record from encrypted data source 142. If a URL (whether encrypted or decrypted) in a record from encrypted data source 142 matches a URL associated with a known entity, then that record is associated with a positive match by, for example, associating the record with an entity identifier of that known/target entity. Example portions of URLs include "https://www." and variations thereof, such as "http://www.", "http://", "https://", and "www.". Prior to the matching, URLs may be filtered to exclude aggregator URLs, which are URLs from aggregator domains (e.g., Yahoo!, Facebook, and LinkedIn) that allow entities (e.g., companies) to host their respective webpages on the domain.

For each record in encrypted data source 142 (or for each such record that is not indicated in feedback data source 144), offline sampling component 140 identifies a data item in the record that corresponds to the URL. For example, each record includes twenty data fields, each corresponding to a different attribute of a target entity. (The value in some of the data fields may be NULL, indicating that there is no data for that data field. For example, the geographic location of the entity may be unknown.) The ninth data field may be for a URL of the target entity. If that data field is not NULL, then offline sampling component 140 reads that URL. If the URL is encrypted, then offline sampling component 140 may decrypt the URL and then identify known URLs to which offline sampling component 140 (or server system 130) has access. Alternatively, offline sampling component 140 may compare the encrypted URL with known encrypted URLs if offline sampling component 140 (or another component of server system 13) has access to the same encryption key (e.g., or hash function) that was used to encrypt the URL. In this latter scenario, offline sampling component 140 (or another component) encrypts URLs of known entities and stores those encrypted URLs in association with the corresponding known entities.

If the URL from a record is decrypted, then offline sampling component 140 may perform one or more normalizing operations on the URL. For example, all characters in the URL are converted to lowercase and the following character strings are removed: "http://", "https://", and "www.".

In order to speed up processing of searching for matching URLs, offline sampling component 140 may leverage an index that was previously generated for URLs that are associated with known entities. In this way, a simple scan of potentially millions of records (each containing one or more URLs of a different entity) may be avoided.

Offline Sampling Component: Continued

In order to generate training instances based on records from encrypted data source 142, offline sampling component 140 transmits data pairs to decryption component 150. Each data pair includes (1) an encrypted record from encrypted data source 142 and (2) a list of one or more entity identifiers. An entity identifier may have originated from an override record from feedback data source 144 or may have been determined from a URL search match. One of the entity identifiers in the list is of the target entity indicated in the encrypted record. Others of the entity identifiers in the list are of other entities, which were identified by a user of a client system as not matching the target entity indicated in the encrypted record. For example, the list of entity identifiers may include multiple entity identifiers of entities that are different than the target entity and, therefore, do not match target entity.

For example, a data pair includes encrypted data, that originated from a client system, about a particular company. However, the encrypted data may only include two or three attribute values, such as a company name and an industry name. The data pair also includes an entity identifier that was identified, either using (a) an URL associated with the corresponding encrypted record or (b) feedback data. The entity identifier may later be used to retrieve one or more attributes values from entity database 146, which values are eventually used (along with a decrypted version of the encrypted data) to generate one or more feature values for a machine-learned model, as described in more detail herein.

Transmission of data pairs to decryption component 150 may be performed in one or more ways. For example, such transmission may be made through an API of decryption component 150 or through an event processing system. In the latter example, server system 130 implements an event processing system, an example of which is Apache Kafka. In this embodiment, offline sampling component 140 generates an event for each data pair. The event is generated to include a certain topic or label. Offline sampling component 140 publishes the event to the event processing system by, for example, sending the event to an event queue. An event listener of decryption component 150 "listens" for (or subscribes to) events, from the event queue, that have the certain topic or label.

Decryption Component

For each data pair that decryption component 150 receives, decryption component 150 decrypts the encrypted data to generate decrypted (or un-encrypted) data. For example, if an event includes an encrypted record, then decryption component 150 uses a decryption key to decrypt that record to produce multiple decrypted data items. Decryption component 150 also associates the decrypted data items with the entity identifier (referred to as the "target entity identifier") from the data pair. Decryption component 150 processes data in volatile memory and does not store any of the decrypted data items in persistent, or non-volatile, storage.

In an embodiment, decryption component 150 generates a data object that includes the decrypted data items (each corresponding to a different entity attribute), the target entity identifier, zero or more entity identifiers of any non-matching entities determined from an feedback data record and, optionally, a record identifier of the encrypted record. The record ID may be used in one or more downstream processes, such as reporting. The order of the decrypted data items may dictate which entity attribute corresponds to each data item. Decryption component 150 transmits the data object to training data component 160. Such transmission may be through any means, such as a request to an API of training data component 160, as long as the request is not stored in non-volatile storage.

Training Data Component

Training data component 160 receives a data object generated by decryption component 150 and generates a resolution event, described in more detail herein. A resolution event may be used to generate a training instance to further train machine-learned model 190 and/or to evaluate machine-learned model 190. In order to generate a resolution event, multiple steps may be performed, such as feature value generation and candidate generation.

Training Data Component: Feature Value Generation

Feature value generation involves identifying attribute values of the target entity (i.e., from the data object), identifying the attribute of each attribute value, identifying a definition of each feature of machine-learned model 190, and computing, for each feature thereof, a feature value based on one or more attribute values and the definition of the feature.

Some of the features may be based on comparing an attribute value (of the target entity) from the data object with an attribute value of a known entity. The attribute values of a known entity may originate from an entity profile database (not depicted) that is hosted and maintained by server system 130. A "known entity" is one in which an entity identifier is known. The entity identifier is used to identify a record or row, in the entity profile database, corresponding to the entity. The entity identifier was included in the data object by decryption component 150. In the context of candidate generation described in more detail herein, "known entities" includes candidate entities and entity identifiers are retrieved therefor.

An example of a definition of a feature is whether an attribute value (such as a specific name) in a data object matches a corresponding attribute value of a known entity. Another example of a feature definition is a number of changes that would need to be made to a string from the data object in order that the changed string matches a corresponding string of the known entity. Another example of a feature definition is a geographic similarity between a geographic location indicated in the data object and a geographic location associated with a known entity. For example, USA partially matches New York, USA and France partially matches Europe, and Japan does not match Mexico. Another example of a feature definition is whether the industry of the target entity (i.e., indicated in the data object) matches a particular pre-defined industry. Therefore, some feature definitions may be based on matching an attribute of a target entity with the corresponding attribute of a known entity while other feature definitions might not be based on comparing attributes of a target entity with a known entity.

Given the above example feature definitions, examples of a feature value include a Boolean value (e.g., True or False or 1 or 0), a numerical score that reflects a textual similarity between two attribute values (e.g., strings or integer values), and a numerical score that reflects another type of similarity between two entities. In this way, none of the feature values reveal an identity of a target entity, such as a name of the target entity, a logo of the target entity, a size of the target entity, or a location of the target entity. Such a set of feature values is considered secure. Any unauthorized access to the feature values would not reveal the identity of the target entity or any attributes of the target entity. Therefore, the set of feature values may be persistently stored in non-volatile storage.

Training Data Component: Candidate Generation

Candidate generation refers to generating a list of candidate entities, each of which is considered similar to the "target entity," or the entity that is associated with the data object and that is identified by the entity identifier included in the data object from decryption component 150. Candidate generation is useful in evaluating machine-learned model 190 and generating negative training instances. In another embodiment, candidate generation is skipped, in which case training data component 160 generates a positive training instance for each data object and a limited number of negative training instances for one or more data objects. For example, a data object may include one or more entity identifiers of non-matching entities, for which one or more negative training instances may be generated. In another embodiment, no negative training instances are generated given a data object.

In the embodiment where training data component 160 identifies candidate entities, identifying a candidate entity given a target entity involves comparing the respective attribute values of at least one entity attribute, such as name. The more attributes that match between a possible entity and the target entity, the higher the temporary match score of that possible entity and the more likely that that possible entity will be selected as a candidate entity.

Candidate generation may be a process that is already implemented by a runtime, production-level component of server system 130. Such a component is referred to as an entity resolution component and may be used in one or more contexts. For example, in identifying, for a client system, a matching entity given one or more attribute values of a target entity, the candidate generation process is invoked to identify a "rough" match of a relatively small subset of all possible entities. Such a rough matching may involve invoking one or more heuristic rules that involve comparing attribute values of a target entity with attribute values of a possible entity. The small subset are the candidate entities. For each candidate entity, a set of attribute values of the candidate entity is retrieved, such as from the entity profile database. Then, a set of feature values is generated based on a definition for each feature of model 190, the set of attribute values of a candidate entity, and the set of attribute values from the data object. Once a set of feature values is generated for a candidate entity, machine-learned model 190 is invoked by inputting the set of feature values and, as a result, outputs a score (or "match score"), which reflects a likelihood that the candidate entity matches, or is the same as, the target entity of the data object. Machine-learned model 190 is invoked a number of times that is equal to the number of candidate entities. The candidate entity that has the highest score relative to the other candidate entities may be selected as a matching entity for the target entity (presuming that that highest score is greater than a certain threshold). Thus, this approach allows for a relatively quick identification of a matching entity that avoids invoking model 190 for every possible entity indicated in the entity profile database. Candidate generation is particularly useful when the number of possible entities is in the millions or even billions. Scoring millions or billions of possible entities for each target entity that is presented to server system 130 would consume a significant amount of computer resources and the time to identify a potential matching candidate would be unacceptable according to user expectations.

A set of candidate entities may be identified in one or more ways, such as implementing rules that take one or more first attribute values from the data object as input and involve comparing the first attribute values to one or more corresponding attribute values of other entities. The attribute values of the other entities may be stored in an entity profile database that is accessible to training data component 160. If the comparison indicates that at least one of the corresponding pairs of attribute values is the same (or similar above a certain threshold), then the corresponding entity is considered a candidate entity. For example, a name of a target entity is "Cloudy, Inc.," which provides cloud management services, while an entity whose profile is stored in the entity profile database also has the name "Cloudy." However, the latter entity is a small business that makes and sells cupcakes. Even though other attributes of the respective entities may be very different (such as industry, geography, size), because the names of the respective entities at least partially match, the latter entity is considered a candidate entity relative to the target entity.

One way to identify candidate entities quickly is to leverage one or more indexes. For example, an index may have been constructed based on an entity attribute, such as entity name. Then, given a name of a target entity, the index is traversed to identify one or more index entries that contain a name that is similar to the name of the target entity, such as a name that matches at least the first four characters of the target entity name. In one implementation, a threshold value N is set as a number of candidates to retrieve, such as 5, 10, or 20. If more candidates than this threshold are retrieved, then a light-weight process (referred to a first-pass ranker (FPR)), may be used to pick the top N candidates.

If candidate generation is invoked, then each candidate entity is scored, using machine-learned model 190, based on the attribute values of the target entity from the data object and attribute values of the candidate entity. The attribute values of a candidate entity are retrieved from a data store (such as an entity profile database maintained by server system 130) that stores profiles of known entities. If twenty candidate entities are identified for a target entity during the candidate entity generation process, then twenty sets of feature values may be generated for the target entity.

If the target entity is one of the identified candidate entities, then that indicates that the target entity would have been identified in a "live" (or production) scenario where entity resolution is involved and, accordingly, would have been scored using machine-learned model 190. Such information is useful when evaluating model 190 using model evaluation component 180.

Training Data Component: Resolution Event Generation

After one or more sets of feature values are generated and/or a set of candidate entities are identified, training data component 160 generates a resolution event. A resolution event is used by (a) training component 170 to generate training instances to further train machine-learned model 190 and/or (b) model evaluation component 180 to evaluate machine-learned model 190.

If a resolution event is destined for use in generating one or more training instances, then the resolution event at least includes information sufficient for generating a positive training instance: data indicating a positive label and a set of feature values that was generated based on attribute values of the target entity from the decrypted record. The same or different resolution event may also include information sufficient for generating a negative training instance, which may be generated when an feedback data record is used to identify an entity that does not match the target entity of the original encrypted record. Such sufficient information includes data indicating a negative label and a set of feature values that was generated based on attribute values of the target entity and attribute values of the non-matching entity. Similarly, the same or different resolution event may also include information sufficient for generating a negative training instance for each non-matching candidate entity identified through the candidate entity generation process. Such sufficient information includes data indicating a negative label and a set of feature values that was generated based on attribute values of the target entity and attribute values of the non-matching candidate entity.

If a resolution event is destined for use in evaluating machine-learned model 190, then the resolution event includes the target entity identifier from the data object, a list of candidate entity identifiers, and a model score produced for each candidate entity. The resolution event may also include a version identifier that identifies a version of machine-learned model 190, of which multiple versions may exist. The resolution event may also include a match indicator that indicates whether the target entity was identified in the candidate generation process. Thus, the match indicator may be a Boolean value or a 0 or a 1. Alternatively, a match determination may be performed later by model evaluation component 180 by determining whether the target entity identifier exists in the list of candidate entity identifiers.

Importantly, a resolution event does not include any target entity identifying information or any information from the corresponding decrypted record.

In an embodiment, a resolution event includes information sufficient for generating one or more training instances and for evaluating machine-learned model 190. Thus, a downstream process that receives such a resolution event accesses only those portions of the resolution event that the downstream process needs to perform its operations. For example, model evaluation component 180 may ignore sets of feature values while training component 170 may ignore any scores of candidate entities.

Training data component 160 causes the resolution event to be stored in non-volatile storage. For example, training data component 160 stores the resolution event in an event queue with a particular topic, allowing downstream event listeners to retrieve the resolution event and perform one or more operations based thereon. As another example, training data component 160 stores the resolution event, along with an event number and/or timestamp, in an event database, to which training component 170 has access.

Training Component

Training component 170 identifies a resolution event that was generated by training data component 160. Such identification may involve accessing an event database that stores resolution events and identifying a resolution event with an event number that is after the most recent event number that training component 170 processed. Alternatively, training component 170 subscribes to events of a certain topic through an event processing system. Thus, functionality of training component 170 is activated when it receives a resolution event from the event processing system.

Training component 170 generates one or more training instances based on a resolution event. If there is only a single set of feature values in the resolution event, then training component 170 generates only a single training instance and it is a positive training instance. If there are additional sets of feature values in the resolution event, then training component 170 generates a negative training instance for each additional set of feature values.

Generating a training instance involves storing a set of feature values in a particular order and in a particular format that is expected by a machine learning process that training component 170 (or another component) implements to train a model. Training instance generation also involves adding a positive or negative label to the training instance.

Training component 170 adds the training instance to a set of training data. Initially, the set of training data may be empty. Alternatively, the set of training data includes training data that was previously used to train a current version of machine-learned model 190. The set of training data may be limited to training data that is generated from encrypted data source 142. Additionally or alternatively, the set of training data may be limited to training data that was generated in a certain period of time, such as the last 28 days. Thus, a timestamp may be stored in association with each training instance and that timestamp is used to identify such training data. Alternatively, the set of training data may be limited to training data that was generated based on data that was generated in a certain period of time. For example, the set of training data is limited to training data that is generated based on feedback data records that were created in the last two weeks.

Machine Learning

Embodiments are not limited to any particular machine learning technique for generating or training machine-learned model 190. Example machine learning techniques include linear regression, logistic regression, random forests, naive Bayes, and Support Vector Machines (SVMs). Advantages that machine-learned models have over rule-based models include the ability of machine-learned models to output a probability (as opposed to a number that might not be translatable to a probability), the ability of machine-learned models to capture non-linear correlations between features, and the reduction in bias in determining weights for different features.

Machine-learned model 190 may output different types of data or values, depending on the input features and the training data. For example, each training instance comprises a label and multiple feature values, each corresponding to a different feature.

Initially, the number of features that are considered for training may be significant, such as in the hundreds. After training a machine-learned model and validating the model, it may be determined that a subset of the features have little correlation or impact on the final output. In other words, such features have low predictive power. Thus, machine-learned coefficients or weights for such features may be relatively small, such as 0.01 or −0.001. In contrast, weights of features that have significant predictive power may have an absolute value of 0.2 or higher. Training component 170 may identify and remove, from a set of training data, features with little predictive power. Removing such features can speed up the process of training future versions of machine-learned model 190 and computing output scores.

Model Evaluation Component

Model evaluation component 180 evaluates machine-learned model 190 based on one or more resolution events. If a resolution event is destined for model evaluation component 180, then the resolution event includes multiple scores, one for each candidate entity, one of which may be the target entity. In some cases, a score does not exist for the target entity, which means that the candidate generation process did not identify the target entity as a candidate entity. Using the scores, model evaluation component 180 determines whether the score of the target entity is higher than the scores of the candidate entities. If so, then an entity resolution model that invokes machine-learning model 190 is accurate, at least with respect to this resolution event. If not, or if the target entity is not among the candidate entities, then the entity resolution model that invoked machine-learning model 190 is not accurate, at least with respect to this resolution event. Based on the scores, and the lack of scores for target entities, across multiple resolution events, one or more measures of accuracy may be generated. Examples of measures include precision and recall.

Example Process

Figure 4:
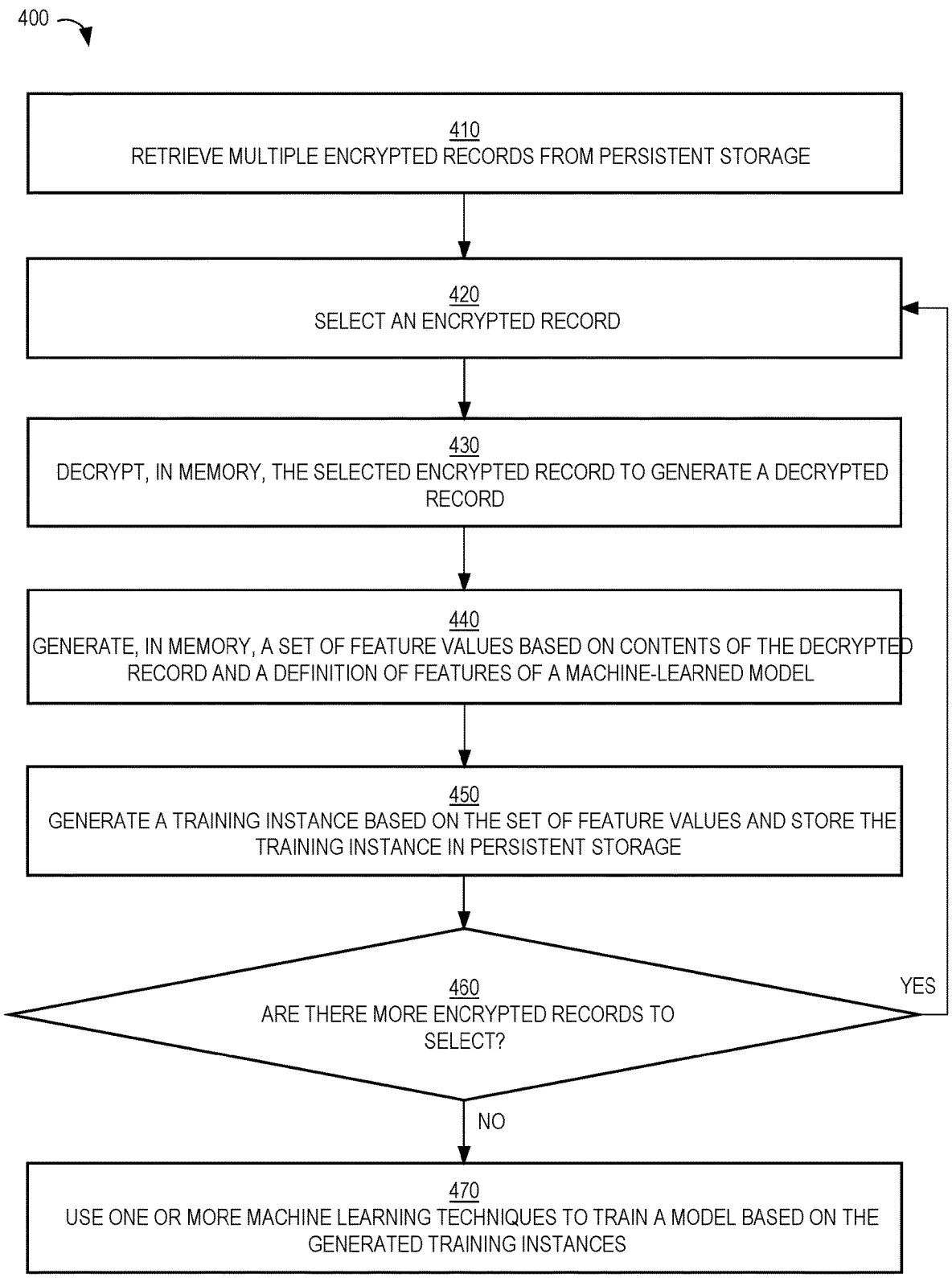
FIG. 4 is a flow diagram that depicts an example process for securely generating training data, in an embodiment.

FIG. 4 is a flow diagram that depicts an example process 400 for securely generating training data, in an embodiment. Process 400 may be implemented by different components of server system 130.

At block 410, multiple encrypted records are retrieved from a persistent storage, such as encrypted data source 142. The original source of the encrypted records may be remote relative to server system 130, such as from client system 112. Thus, prior to block 410, the encrypted records may have been transmitted from a client system to server system 130 and stored in the persistent storage.

At block 420, an encrypted record is selected. In an embodiment where feedback data exists for the encrypted records, block 420 also involves retrieving the feedback data from storage and matching an feedback record with the encrypted record. The feedback record includes a record identifier that identifies a record in the encrypted records. The feedback record includes an entity identifier for the target entity indicated by the encrypted record and, optionally, one or more entity identifiers of entities that are different than the target entity and were previously identified as not matching the target entity.

At block 430, the selected encrypted record is decrypted to generate a decrypted record. The decrypted record includes one or more decrypted data items, such as one or more attribute values of the target entity. Block 430 is performed in volatile memory (which is separate from persistent storage) and may be performed by decryption component 150. Contents of the decrypted record are not stored in persistent storage, only in volatile memory, such as random access memory (RAM).

At block 440, based on contents of the decrypted record and a definition of a plurality of features of a machine-learned model, a set of feature values is generated. Some of the feature values may be Boolean values and other feature values may be measures of similarity, such as between a data item from the decrypted record and a data item (e.g., from entity database 146) of a known entity corresponding to the target entity. Block 440 is performed in memory and may be performed by training data component 160.

In the embodiment where candidate entity generation is performed, block 440 may involve using entity identifiers (associated with the encrypted record) of non-matching entities to identify multiple candidate entities and generating a set of feature values for each identified candidate entity.

At block 450, one or more training instances are generated and stored in persistent storage. Block 450 may be performed by training component 170. Each training instance includes a set of feature values generated in block 440. Each training instance also includes a label that indicates whether the target entity of the encrypted record matches a known entity, such as one of the identified candidate entities. The label may come from (a) a feedback data record that is associated with the encrypted record or (b) the encrypted record itself. For example, if the feedback data record indicates a negative match, then the label may be '0' indicating a non-match. If feedback data source 144 only contains positive matches and the training instances are generated based on feedback data source 144, then the label is always positive, such as '1'.

At block 460, it is determined whether there are any more encrypted records to select. If so, then process 400 returns to block 420. Otherwise, process 400 proceeds to block 470.

At block 470, one or more machine learning techniques are implemented to train a machine-learned model based on the training instances that were generated. Block 470 may be performed by training component 470. The machine-learned model may be one that already has some machine-learned coefficients that were learned through training based on other training instances, such as manually-labeled training instances. Alternatively, the coefficients of the model that is trained at block 470 is first initialized with random coefficients and the coefficients are learned based on the training instances generated in block 450.

In the embodiment where candidate entity generation is performed, instead of, or in addition to, block 450, process 400 involves using a version of the machine-learned model to generate a score for each candidate entity based on the set of feature values generated for that candidate entity. The scores, a list of the candidate entities, and an entity identifier (of the corresponding target entity whose attribute values from the decrypted record are used to identify the candidate entities) are stored in a model evaluation record, or resolution event, which is eventually used to evaluate the accuracy of the version of the machine-learned model.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
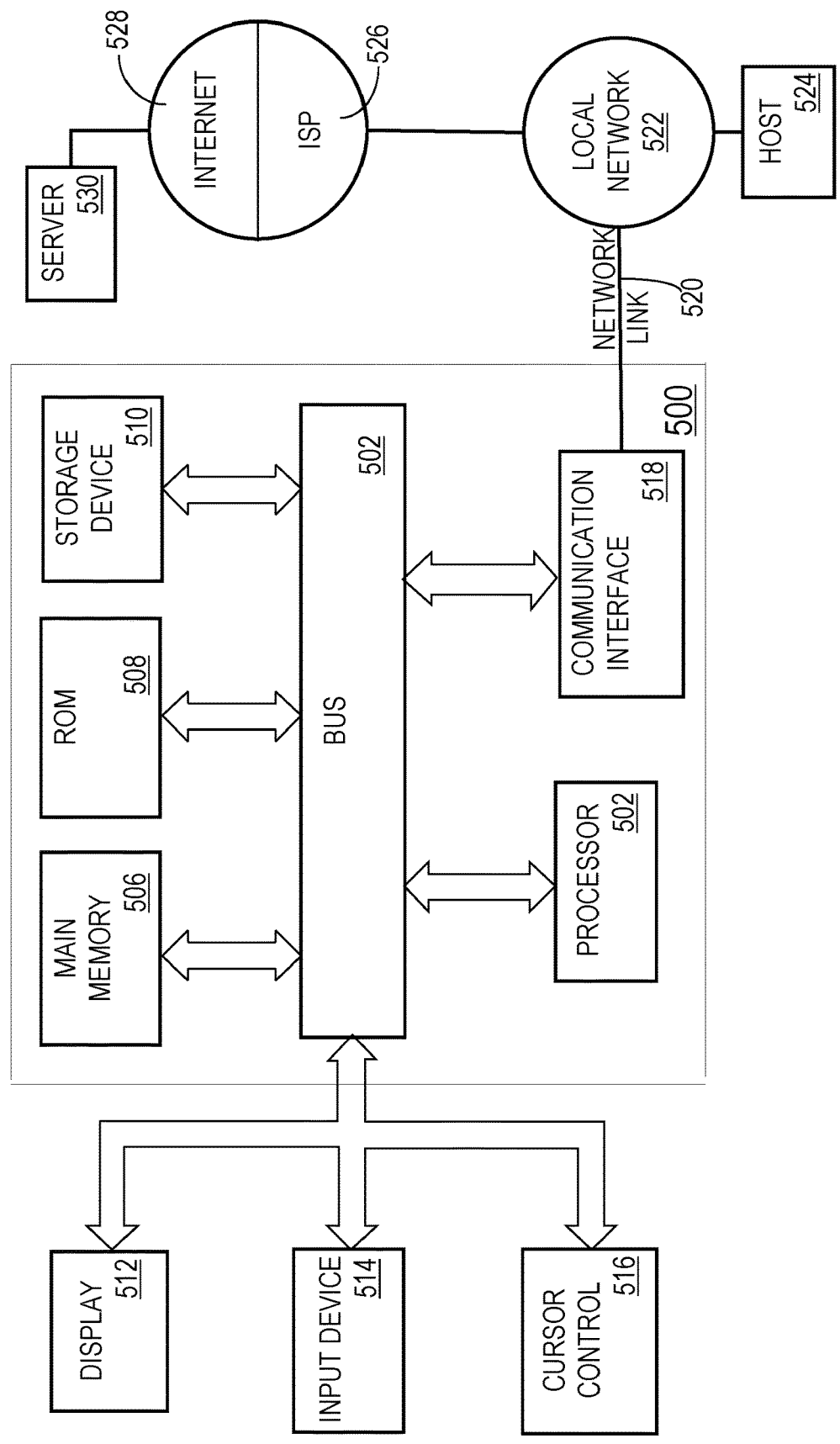
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of fthe set of claims that issue from this application, in the specific form in which such claims issue, including any subsequent correction.

What is claimed is:

1. A method comprising:
    retrieving a plurality of encrypted records from a first persistent storage;
    for each encrypted record in the plurality of encrypted records:
        decrypting, in memory, said each encrypted record to generate a decrypted record that comprises a plurality of attribute values;
        generating, based on the plurality of attribute values, a plurality of feature values, wherein a method of generating a feature value comprises computing a value based on a comparison of a first attribute value of the decrypted record and a second attribute value associated with a second record different from the decrypted record, and the plurality of feature values comprises at least one value computed by applying the method to the first attribute value and the second attribute value;
        storing, in a second persistent storage, in a training instance, the plurality of feature values and a label in association with the plurality of feature values;
    using one or more machine learning techniques to train a machine-learned model based on training data that includes the training instances that are stored in the second persistent storage;
    wherein the method is performed by one or more computing devices.

2. The method of claim 1, wherein the plurality of attribute values comprises a first plurality of attribute values, further comprising identifying a record comprising a second plurality of attribute values, wherein generating the plurality of feature values comprises:
    for a first attribute value of the first plurality of attribute values, performing a comparison between the first attribute value and a second attribute value in the second plurality of attribute values;
    generating a first feature value in the plurality of feature values based on the comparison.

3. The method of claim 2, wherein a result of the comparison is a similarity score that indicates a similarity measure between the first attribute value and the second attribute value.

4. The method of claim 2, wherein a result of the comparison is a Boolean value.

5. The method of claim 1, further comprising:
    storing feedback data that is generated based on user input that indicates that (1) a first entity does not match a particular entity indicated in an encrypted record of the plurality of encrypted records and (2) a second entity matches the particular entity;
    wherein the feedback data includes an entity identifier of the second entity;
    based on the feedback data, storing the entity identifier of the second entity in association with the decrypted record.

6. The method of claim 5, further comprising:
    based on the entity identifier, retrieving a second plurality of attribute values of the second entity;
    wherein generating the plurality of feature values is also based on the second plurality of attribute values.

7. The method of claim 1, further comprising:
for a particular encrypted record from the first persistent storage, identifying a uniform resource locator (URL) associated with the particular encrypted record;
using the URL to identify a record in an entity profile database and identify an entity identifier associated with the record;
associating the entity identifier with the particular encrypted record.

8. The method of claim 1, wherein storing the plurality of feature values and the label in the training instance comprises:
generating a resolution event that includes the plurality of feature values and the label;
transmitting the resolution event to an event publishing system;
receiving, by a subscriber of the event publishing system, the resolution event;
transforming contents of the resolution event based on a training data format to generate transformed content;
including the transformed content in the training instance.

9. The method of claim 1, further comprising:
for a particular encrypted record, based on at least a portion of the decrypted record, identifying a plurality of candidate entities;
for each candidate entity in the plurality of candidate entities:
identifying a set of attribute values of said each candidate entity;
generating, based on the decrypted record, the set of attribute values, and
a definition of the plurality of features of a version of the machine-learned model, a set of feature values;
using the version of the machine-learned model to generate, based on the set of feature values, a score for said each candidate entity;
storing the score and an identifier of said each candidate entity in a resolution event;
wherein the resolution event include a plurality of scores, one for each candidate entity of the plurality of candidate entities;
determining a measure of accuracy of the version of the machine-learned model based on the plurality of scores.

10. The method of claim 9, wherein:
the resolution event also includes an entity identifier of a target entity that is associated with the plurality of attribute values;
the method further comprising making a determination that the entity identifier does not match the identifier of any of the plurality of candidate entities;
the measure of accuracy is also based on the determination.

11. The method of claim 1, further comprising:
based on at least a portion of the decrypted record, identifying one or more candidate entities;
for each candidate entity in the one or more candidate entities:
identifying a set of attribute values of said each candidate entity;
generating, based on the decrypted record, the set of attribute values, and
a definition of the plurality of features of a version of the machine-learned model, a set of feature values;
storing, in a second training instance, the set of feature values and a negative label that indicates that said each candidate entity does not match an entity that is associated with the decrypted record.

12. One or more storage media storing instructions which, when executed by one or more processors, cause:
retrieving a plurality of encrypted records from a first persistent storage;
for each encrypted record in the plurality of encrypted records:
decrypting, in memory, said each encrypted record to generate a decrypted record that comprises a plurality of attribute values;
generating, based on the plurality of attribute values, a plurality of feature values, wherein a method of generating a feature value comprises computing a value based on a comparison of a first attribute value of the decrypted record and a second attribute value associated with a second record different from the decrypted record, and the plurality of feature values comprises at least one value computed by applying the method to the first attribute value and the second attribute value;
storing, in a second persistent storage, in a training instance, the plurality of feature values and a label in association with the plurality of feature values;
using one or more machine learning techniques to train a machine-learned model based on training data that includes the training instances that are stored in the second persistent storage.

13. The one or more storage media of claim 12, wherein the plurality of attribute values comprises a first plurality of attribute values, further comprising identifying a record comprising a second plurality of attribute values, wherein generating the plurality of feature values comprises:
for a first attribute value of the first plurality of attribute values, performing a comparison between the first attribute value and a second attribute value in the second plurality of attribute values;
generating a first feature value in the plurality of feature values based on the comparison.

14. The one or more storage media of claim 12, further comprising:
storing feedback data that is generated based on user input that indicates that (1) a first entity does not match a particular entity indicated in an encrypted record of the plurality of encrypted records and (2) a second entity matches the particular entity;
wherein the feedback data includes an entity identifier of the second entity;
based on the feedback data, storing the entity identifier of the second entity in association with the decrypted record.

15. The one or more storage media of claim 14, further comprising;
based on the entity identifier, retrieving a second plurality of attribute values of the second entity;
wherein generating the plurality of feature values is also based on the second plurality of attribute values.

16. The one or more storage media of claim 12, further comprising:
for a particular encrypted record from the first persistent storage, identifying a uniform resource locator (URL) associated with the particular encrypted record;
using the URL to identify a record in an entity profile database and identify an entity identifier associated with the record;

associating the entity identifier with the particular encrypted record.

17. The one or more storage media of claim 12, wherein storing the plurality of feature values and the label in the training instance comprises:
   generating a resolution event that includes the plurality of feature values and the label;
   transmitting the resolution event to an event publishing system;
   receiving, by a subscriber of the event publishing system, the resolution event;
   transforming contents of the resolution event based on a training data format to generate transformed content;
   including the transformed content in the training instance.

18. The one or more storage media of claim 12, further comprising:
   for a particular encrypted record, based on at least a portion of the decrypted record, identifying a plurality of candidate entities;
   for each candidate entity in the plurality of candidate entities:
      identifying a set of attribute values of said each candidate entity;
      generating, based on the decrypted record, the set of attribute values, and
         a definition of the plurality of features of a version of the machine-learned model, a set of feature values;
      using the version of the machine-learned model to generate, based on the set of feature values, a score for said each candidate entity;
      storing the score and an identifier of said each candidate entity in a resolution event;
   wherein the resolution event include a plurality of scores, one for each candidate entity of the plurality of candidate entities;
   determining a measure of accuracy of the version of the machine-learned model based on the plurality of scores.

19. The one or more storage media of claim 18, wherein:
   the resolution event also includes an entity identifier of a target entity that is associated with the plurality of attribute values;
   the method further comprising making a determination that the entity identifier does not match the identifier of any of the plurality of candidate entities;
   the measure of accuracy is also based on the determination.

20. The one or more storage media of claim 12, further comprising:
   based on at least a portion of the decrypted record, identifying one or more candidate entities;
   for each candidate entity in the one or more candidate entities:
      identifying a set of attribute values of said each candidate entity;
      generating, based on the decrypted record, the set of attribute values, and
         a definition of the plurality of features of a version of the machine-learned model, a set of feature values;
      storing, in a second training instance, the set of feature values and a negative label that indicates that said each candidate entity does not match an entity that is associated with the decrypted record.

* * * * *